US011993274B2

(12) United States Patent
Krutsch et al.

(10) Patent No.: US 11,993,274 B2
(45) Date of Patent: May 28, 2024

(54) MONITORING OF ON-BOARD VEHICLE IMAGE CAPTURING DEVICE FUNCTIONALITY COMPLIANCE (71) Applicant: Zenuity AB, Gothenburg (SE)

(72) Inventors: Robert Krutsch, Munich (DE); Valor Yaldo, Bloomfield, MI (US)

(73) Assignee: Zenuity AB, Gothenburg (SE)

(*) Notice: Subject to any disclaimer, the term of this patent is extended or adjusted under 35 U.S.C. 154(b) by 409 days.

(21) Appl. No.: 17/022,948

(22) Filed: Sep. 16, 2020

(65) Prior Publication Data
US 2022/0080986 A1 Mar. 17, 2022

(51) Int. Cl.
*B60W 50/02* (2012.01)
*B60W 50/04* (2006.01)
(Continued)

(52) U.S. Cl.
CPC ........ *B60W 50/0205* (2013.01); *B60W 50/04* (2013.01); *G06T 7/80* (2017.01);
(Continued)

(58) Field of Classification Search
CPC ............. B60W 50/0205; B60W 50/04; B60W 2050/021; B60W 2050/0215; B60W 2420/42; G06T 7/80; G06T 7/97; G06T 2207/10016; G06T 2207/30168; G06T 2207/30252; G06T 7/0002; G06T 1/00; G06T 2207/10028; G06T 7/521;
(Continued)

(56) References Cited

U.S. PATENT DOCUMENTS 10,916,035 B1* 2/2021 Kroeger ............... G05D 1/0212
2009/0009604 A1* 1/2009 Kanaoka ............... H04N 7/181
348/148
(Continued)

FOREIGN PATENT DOCUMENTS

JP 2002369224 A 12/2002
JP 2008165689 A 7/2008

OTHER PUBLICATIONS

Communication and European Search Report dated Feb. 14, 2022 for patent Application No. 21192380.0, consisting of 8-pages.

*Primary Examiner* — Thomas Ingram
*Assistant Examiner* — Faris Asim Shaikh
(74) *Attorney, Agent, or Firm* — Weisberg I.P. Law, P.A.

(57) ABSTRACT

The present disclosure relates to a method performed by a luminance assessment system of a vehicle for monitoring of on-board vehicle image capturing device functionality compliance with a predeterminable requirement level. The luminance assessment system obtains at respective one or more time instants ($t_1$, $t_2$, $t_3$), a first image and a second image. A first section of the first images and a second section of the second images respectively cover a primary region. A first luminance value of the first section and a second luminance value of the second section are measured. A luminance deviation is determined by comparing at least one of the first luminance values to at least one of the second luminance values. A determination is made that, when the luminance
(Continued)

1 Luminance assessment system deviation exceeds a deviation threshold, the first image capturing device or the second image capturing device failed to function according to the requirement level.

16 Claims, 5 Drawing Sheets

(51) Int. Cl.
    *G06T 7/00*     (2017.01)
    *G06T 7/80*     (2017.01)

(52) U.S. Cl.
    CPC .......... *G06T 7/97* (2017.01); *B60W 2050/021* (2013.01); *B60W 2050/0215* (2013.01); *B60W 2420/403* (2013.01)

(58) Field of Classification Search
    CPC ...... G06T 7/507; G06V 20/56; G06V 10/143; G06V 10/16; G06V 10/22; G06V 10/25; G06V 10/40; G06V 20/584; G06V 10/255; G01J 1/00; H04N 5/2351; H04N 5/351; H04N 5/353; H04N 9/77; H04N 13/133

See application file for complete search history.

(56) References Cited

U.S. PATENT DOCUMENTS

| | | | |
|---|---|---|---|
| 2012/0185167 A1* | 7/2012 | Higuchi | G08G 1/167 382/104 |
| 2013/0039576 A1* | 2/2013 | Ehlgen | G06V 20/56 382/168 |
| 2016/0007018 A1* | 1/2016 | Ooi | G06T 7/0002 348/187 |
| 2016/0129917 A1* | 5/2016 | Gariepy | G05D 1/0246 701/2 |
| 2018/0253630 A1* | 9/2018 | Tamer | H04N 23/40 |
| 2018/0276490 A1* | 9/2018 | Mueller | G06V 10/147 |
| 2020/0055516 A1* | 2/2020 | Craddock | H04N 23/698 |
| 2020/0215972 A1* | 7/2020 | Herman | H04N 23/60 |
| 2020/0377089 A1* | 12/2020 | Fukushige | G01C 21/3602 |
| 2020/0396363 A1* | 12/2020 | Wang | H04N 23/73 |
| 2021/0041539 A1* | 2/2021 | Darrer | G01S 7/4863 |
| 2021/0089802 A1* | 3/2021 | Ikeda | G06V 10/98 |
| 2021/0201464 A1* | 7/2021 | Tariq | G06T 7/0002 |
| 2022/0044424 A1* | 2/2022 | Jayaraman | G06T 7/521 |

* cited by examiner

MONITORING OF ON-BOARD VEHICLE IMAGE CAPTURING DEVICE FUNCTIONALITY COMPLIANCE

TECHNICAL FIELD

The present disclosure relates to monitoring of on-board vehicle image capturing device functionality compliance with a predeterminable requirement level.

BACKGROUND

An increasing number of modern vehicles have advanced driver-assistance systems, ADAS, to increase vehicle safety and more generally road safety. ADAS—which for instance may be represented by lane departure avoidance, adaptive cruise control, ACC, collision avoidance system, forward collision warning, etc.—are electronic systems that may aid a vehicle driver while driving. To function as intended, ADAS may rely on inputs from multiple data sources, such as e.g. LIDARs, radars, ultrasonics, cameras, automotive imaging, image processing, computer vision, and/or in-car networking. Moreover, in a not too distant future, autonomous or automated driving systems, AD systems, will to greater extent find their way into modern vehicles. An AD system is a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all responsibilities to the system. An AD system commonly combines a variety of sensors to perceive the vehicle's surroundings, such as e.g. radar, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

In current ADAS and AD systems, a safety level of features is commonly propagated top down towards all components contributing to a function. For one or more on-board image capturing devices such as cameras—e.g. comprised in a surround camera system—that often implies reaching an Automotive Safety Integrity Level, ASIL, level such as an ASIL B level. Reaching such a functional safety goal may require ensuring that respective image capturing device—or rather imagers thereof—is functioning properly. Accordingly, voltage and clock monitoring is commonly required for detection of abnormal voltages that can cause abnormal luminance in captured images—a state insinuating improper functioning of said image capturing device(s) or its imager(s) which in turn may result in non-compliance with reaching said safety goal. Such voltage monitoring is, however, commonly done with specialized integrated circuit, IC, components, that may add to complexity and/or to overall system cost.

SUMMARY OF THE INVENTION

It is therefore an object of embodiments herein to provide an approach for in an improved and/or alternative manner monitor on-board vehicle image capturing device functionality compliance with a predeterminable requirement level. The object above may be achieved by the subject-matter disclosed herein. Embodiments are set forth in the appended claims, in the following description and in the drawings.

The disclosed subject-matter relates to a method performed by a luminance assessment system of a vehicle for monitoring of on-board vehicle image capturing device functionality compliance with a predeterminable requirement level. The vehicle comprises two or more image capturing devices adapted to capture surroundings of the vehicle, wherein a first image capturing device has a first field of view and a second image capturing device has a second field of view with a primary region thereof at least partly overlapping the first field of view. The luminance assessment system obtains at respective one or more time instants, a respective first image with support from the first image capturing device and a respective second image with support from the second image capturing device, wherein a first section of the respective first images and a second section of the respective second images respectively cover the primary region. The luminance assessment system further measures for respective first image a respective first luminance value of the first section, and for respective second image a respective second luminance value of the second section. Moreover, the luminance assessment system determines a luminance deviation based on comparing at least one of the respective first luminance values to at least one of the respective second luminance values. The luminance assessment system furthermore determines, when the luminance deviation exceeds a deviation threshold, that the first image capturing device or the second image capturing device fails to function according to the requirement level.

The disclosed subject-matter further relates to a luminance assessment system of a vehicle for—and/or adapted for—monitoring of on-board vehicle image capturing device functionality compliance with a predeterminable requirement level. The vehicle comprises two or more image capturing devices adapted to capture surroundings of the vehicle, wherein a first image capturing device has a first field of view and a second image capturing device has a second field of view with a primary region thereof at least partly overlapping the first field of view. The luminance assessment system comprises a primary image obtaining unit for obtaining at respective one or more time instants, a respective first image with support from the first image capturing device and a respective second image with support from the second image capturing device, wherein a first section of the respective first images and a second section of the respective second images respectively cover the primary region. The luminance assessment system further comprises a primary luminance measuring unit for measuring for respective first image a respective first luminance value of the first section, and for respective second image a respective second luminance value of the second section. Moreover, the luminance assessment system comprises a primary deviation determining unit for determining a luminance deviation based on comparing at least one of the respective first luminance values to at least one of the respective second luminance values. The luminance assessment system furthermore comprises a failure identifying unit for determining, when the luminance deviation exceeds a deviation threshold, that the first image capturing device or the second image capturing device fails to function according to the requirement level.

Furthermore, the disclosed subject-matter relates to a vehicle comprising a luminance assessment system as described herein. Moreover, the disclosed subject-matter relates to a computer program product comprising a computer program containing computer program code means arranged to cause a computer or a processor to execute the steps of a luminance assessment system described herein, stored on a computer-readable medium or a carrier wave. The disclosed subject-matter further relates to a non-volatile computer readable storage medium having stored thereon said computer program product.

Thereby, there is introduced an approach enabling detection of improper functioning of an image capturing device, such as of an imager thereof, which subsequently may imply non-compliance with a set requirement level. That is, since there is obtained at respective one or more time instants, a respective first image with support from the first image capturing device and a respective second image with support from the second image capturing device, wherein a first section of the respective first images and a second section of the respective second images respectively cover the primary region, there is derived at one or more time points from respective first and second image capturing device one or more images respectively comprising the overlapping region of the first and second fields of view. Moreover, that is, since there is measured for respective first image a respective first luminance value of the first section and for respective second image a respective second luminance value of the second section, luminance values are derived for each time point for the areas of the images covering the primary region, i.e. covering the section where the fields of view for the first and second image capturing devices overlap. Accordingly, luminance values applicable for the same area—i.e. the primary region—at one or more points in time, are gathered not only from images obtained by the first image capturing device, but also from images obtained by the second image capturing device. Furthermore, that is, since there is determined a luminance deviation based on comparing at least one of the respective first luminance values to at least one of the respective second luminance values, there may be detected potential discrepancy between on one end one or more luminance values applicable for the overlapping primary region obtained by the first image capturing device and on the other end one or more luminance values applicable for the overlapping primary region obtained by the second image capturing device. Moreover, that is, since there is determined, when the luminance deviation exceeds a deviation threshold, that the first image capturing device or the second image capturing device fails to function according to the requirement level, it is concluded provided that the determined luminance difference—applicable for the overlapping primary region—between luminance values derivable from the first image capturing device and luminance values derivable from the second image capturing device is greater than a predeterminable limit set in view of a predeterminable requirement level, that either the first or the second image capturing device fails to function in accordance therewith. That is, with the introduced concept, there may be detected abnormal image luminance values—which may equate to abnormal voltages—pertinent either the first image capturing device or an imager thereof, or the second image capturing device or an imager thereof. Such abnormal image luminance values and subsequently abnormal voltages in turn insinuate improper functioning, and—should the deviation threshold be exceeded—then non-compliance with the set requirement level, for instance a safety goal such as commonly known ASIL B level, is detected. Accordingly, with the introduced concept according to which image luminance values are monitored, commonly known voltage and clock monitoring by means of IC components—which may add to complexity and/or overall system cost—may be omitted.

For that reason, an approach is provided for in an improved and/or alternative manner monitor on-board vehicle image capturing device functionality compliance with a predeterminable requirement level. The technical features and corresponding advantages of the above mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory. In the following, according to embodiments herein which relate to monitoring of on-board vehicle image capturing device functionality compliance with a predeterminable requirement level, there will be disclosed an approach enabling detection of improper functioning of an image capturing device, such as of an imager thereof, which subsequently may imply non-compliance with said requirement level.

Figure 1:
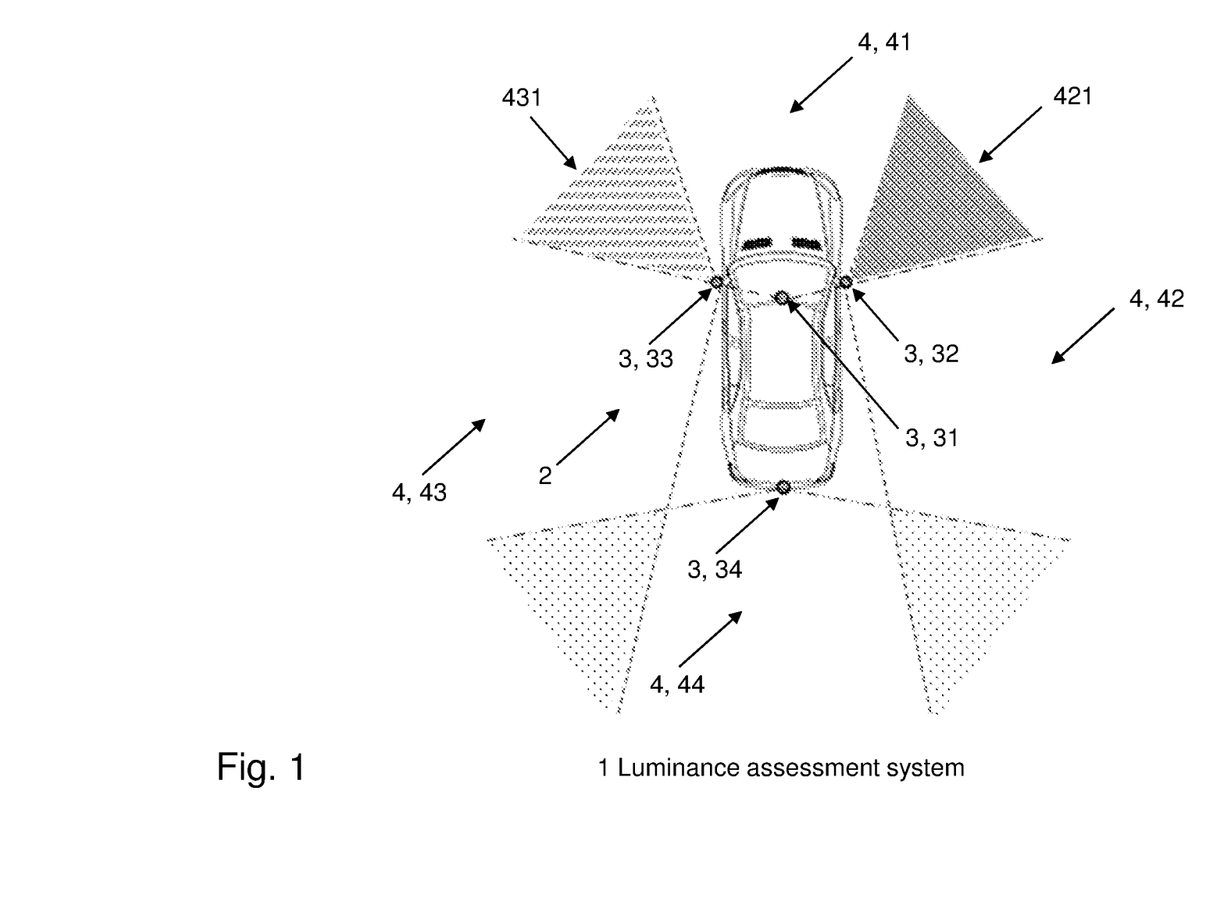
FIGS. 1,2a and 2b illustrate schematic views of an exemplifying luminance assessment system according to embodiments of the disclosure.
Figure 2A:
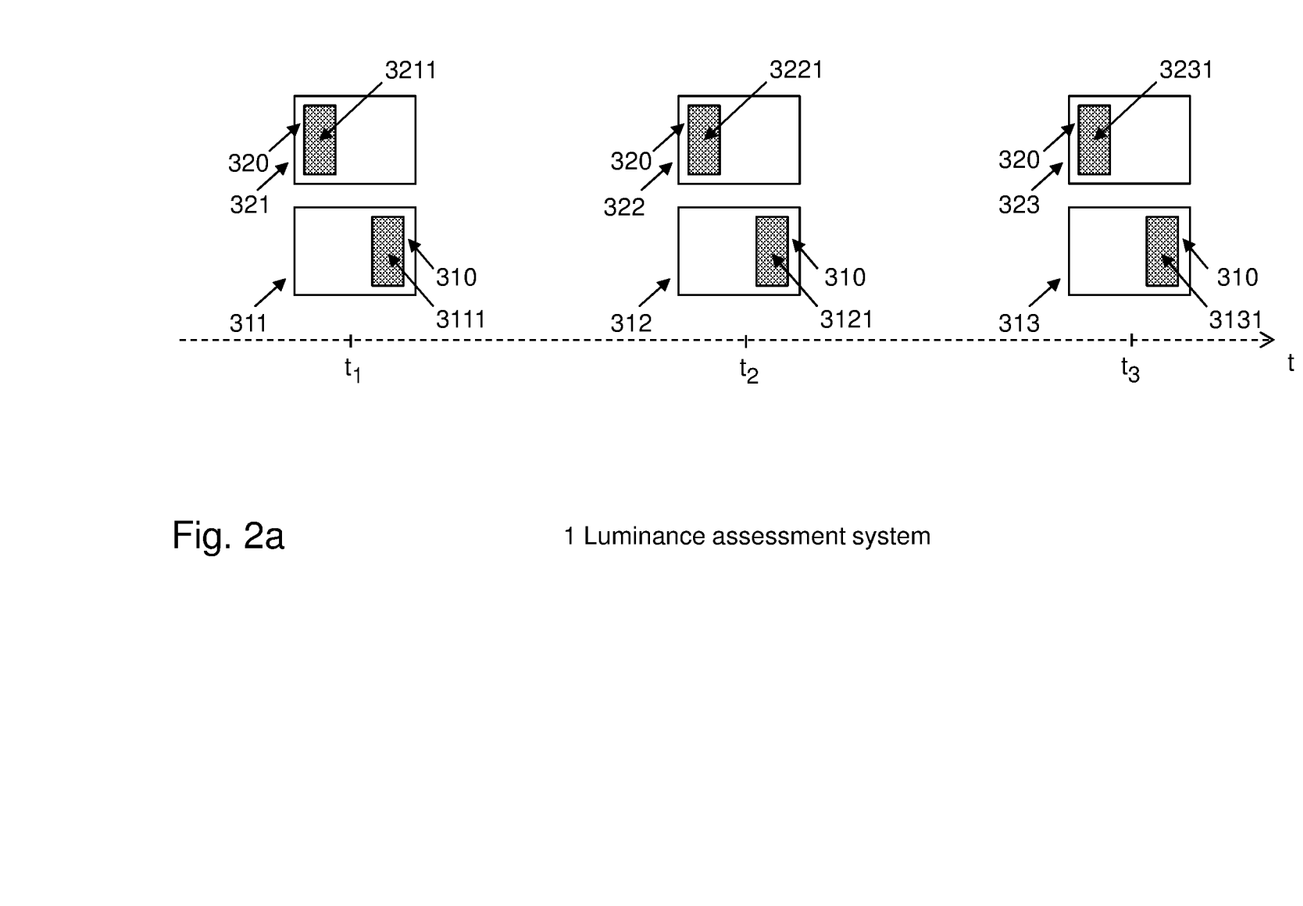
Figure 2B:
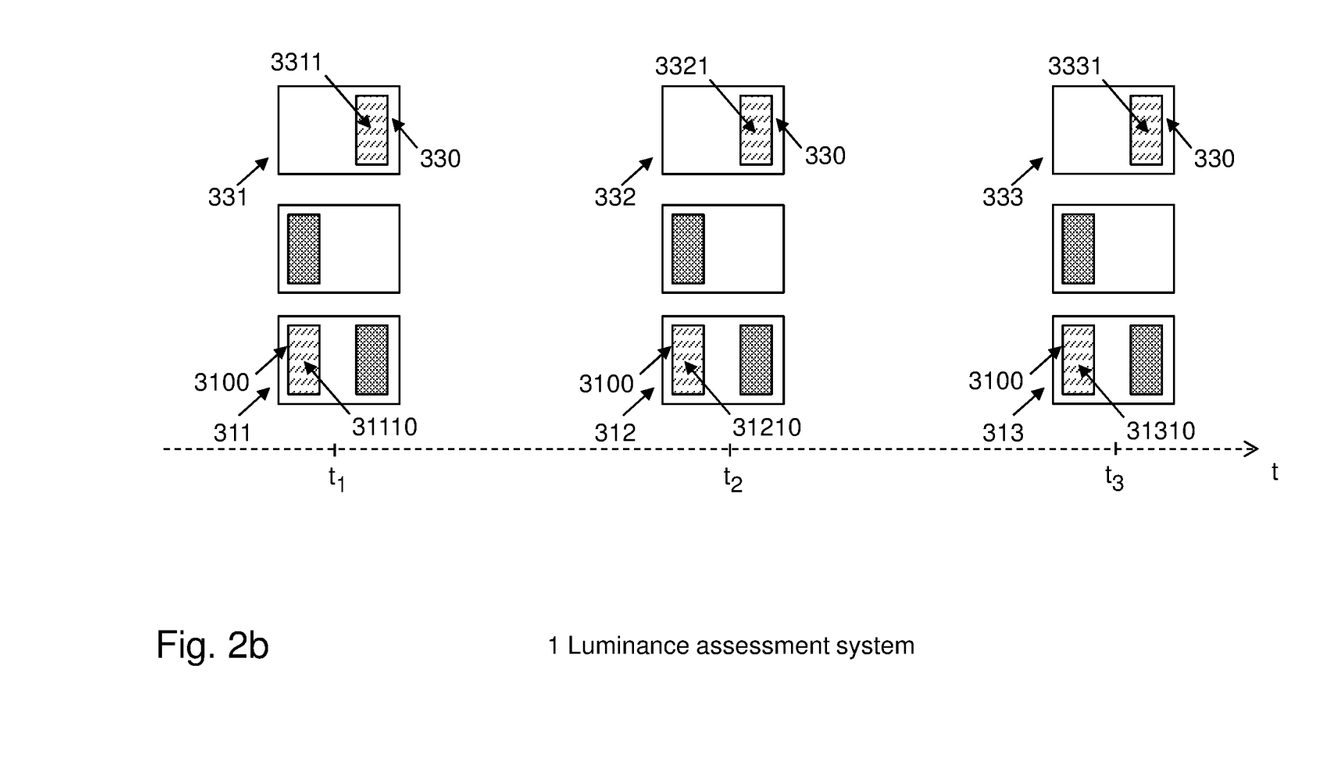
Figure 3:
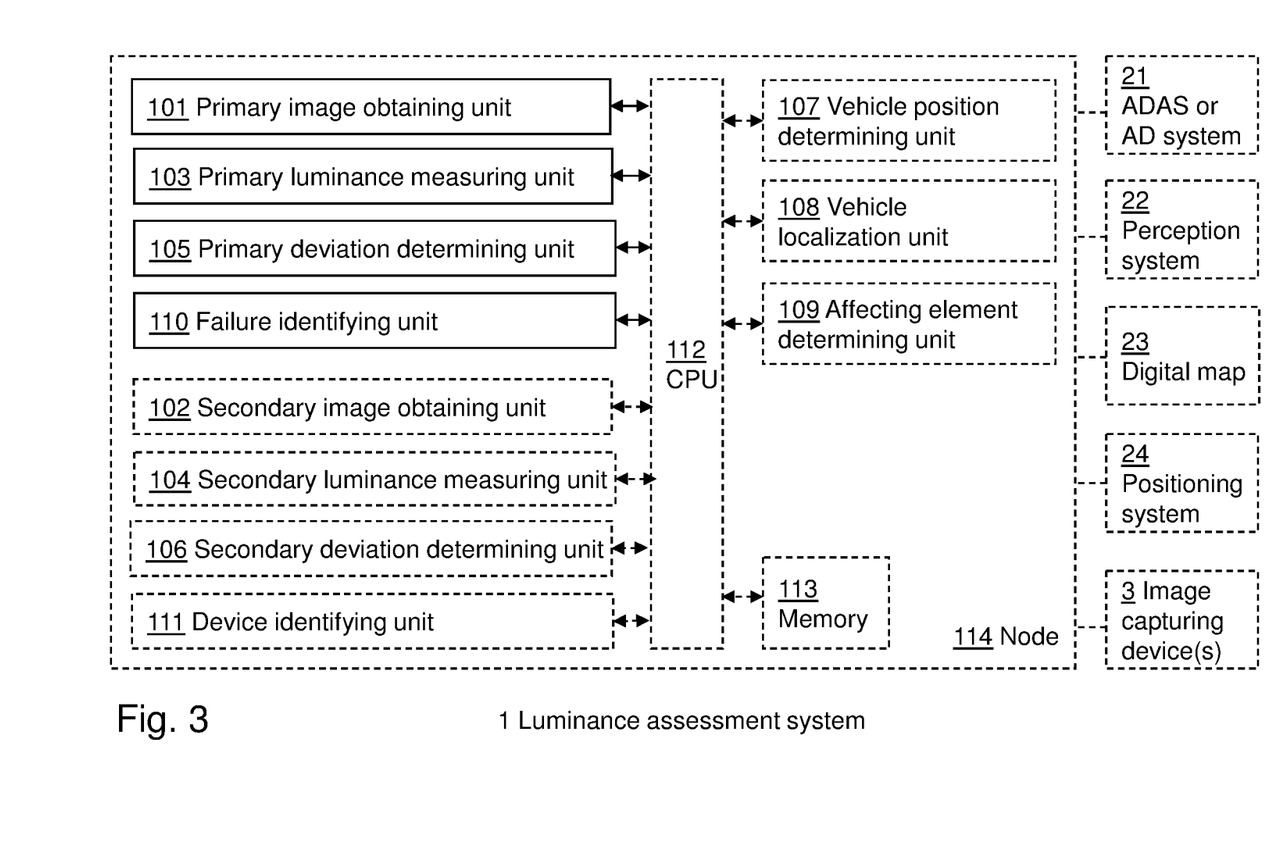
FIG. 3 is a schematic block diagram illustrating an exemplifying luminance assessment system according to embodiments of the disclosure.

Referring now to the figures, there is depicted in FIGS. 1, 2a and 2b schematic views of an exemplifying luminance assessment system 1 according to embodiments of the disclosure, and in FIG. 3 a schematic block diagram illustrating an exemplifying luminance assessment system 1 according to embodiments of the disclosure. The luminance assessment system 1 is for monitoring of on-board vehicle image capturing device functionality compliance with a predeterminable requirement level. The predeterminable requirement level may be represented by any feasible functional goal and/or mission, such as a safety level, for instance a commonly known ASIL level such as an ASIL B level. Moreover, the luminance assessment system 1 may be comprised—or at least partly comprised—in and/or provided on-board a vehicle 2. The exemplifying vehicle 2 may be represented by any arbitrary—e.g. known—manned or unmanned vehicle, for instance an engine-propelled or electrically-powered vehicle such as a car, truck, lorry, van, bus and/or tractor. Moreover, the term "vehicle" may refer to "autonomous and/or at least partly autonomous vehicle", "driverless and/or at least partly driverless vehicle", and/or "self-driving and/or at least partly self-driving vehicle". The vehicle 2 may thus comprise, and/or be adapted to support an optional ADAS and/or AD system 21, i.e. an advanced driver-assistance system and/or an automated driving system. Such an ADAS and/or AD system 21 may refer to any arbitrary ADAS and/or AD system, e.g. known in the art and/or yet to be developed. The vehicle 2 and/or the ADAS or AD system 21 may comprise, be provided with and/or have on-board an optional perception system 22 and/or similar system and/or functionality adapted to estimate surroundings of the vehicle 2, and subsequently adapted to estimate world views of the surroundings e.g. with support from a—e.g. commonly known—digital map 23 such as a high definition, HD, map, and/or an equivalent and/or successor thereof. Such an exemplifying perception system 22 or similar system may refer to any commonly known system and/or functionality, e.g. comprised in one or more electronic control modules, ECUs, and/or nodes of the vehicle 2 and/or the ADAS or AD system 21, adapted and/or configured to interpret sensory information—relevant for driving of the vehicle 2—to identify e.g. obstacles, vehicle lanes, relevant signage, appropriate navigation paths etc. The exemplifying perception system 22 or similar system— which may be adapted to support e.g. sensor fusion, tracking, localization etc.—may thus be adapted to rely on sensory information. Such exemplifying sensory information may for instance be derived from one or more—e.g. commonly known—sensors comprised in and/or provided on-board the vehicle 2 adapted to sense and/or perceive the vehicle's 2 whereabouts and/or surroundings, for instance represented by one or a combination of one or more of a positioning system 24, odometer, inertial measurement units, radar, lidar, ultrasonics, and/or surrounding detecting sensors such as image capturing devices.

The phrase "luminance assessment system" may refer to "luminance monitoring system", "compliance assessment system", "abnormal luminance assessment system" and/or merely "assessment and/or monitoring system", and further according to an example to "abnormal voltage assessment system". The phrase "for monitoring", on the other hand, may refer to "adapted for monitoring", whereas "for monitoring of on-board vehicle image capturing device functionality compliance with a predeterminable requirement level" may refer to "for on-board vehicle image capturing device luminance monitoring", "for on-board vehicle image capturing device functionality monitoring", "for detecting abnormal on-board vehicle image capturing device luminance", "for detecting abnormal on-board vehicle image capturing device voltages" and/or "for detecting improper on-board vehicle image capturing device functioning". Moreover, according to examples, the phrase "for monitoring of on-board vehicle image capturing device functionality compliance with a predeterminable requirement level" may further refer to "for on-board vehicle image capturing device imager luminance monitoring", "for on-board vehicle image capturing device imager functionality monitoring", "for detecting abnormal on-board vehicle image capturing device imager luminance", "for detecting abnormal on-board vehicle image capturing device imager voltages" and/or "for detecting improper on-board vehicle image capturing device imager functioning". Furthermore, the phrase "requirement level" may refer to "functional requirement level" and/or "requirement goal and/or mission", and according to examples further to "safety requirement" and/or "requirement level such as ASIL level requirement, e.g. ASIL B level".

The vehicle 2 comprises two or more image capturing devices 3 adapted to capture surroundings of the vehicle 2, such as at a respective field of view 4. Respective field of view 4 may be of any feasible extent, dimensions and/or degrees, for instance dictated by the implementation at hand and/or by characteristics associated with respective image capturing device 3. The two or more image capturing devices 3—which may be distributed in any arbitrary feasible manner e.g. to capture a section of or even up to 360 degrees of the vehicle's 2 surroundings—may be represented by any—e.g. known—sensors, functionality and/or systems adapted to capture images of vehicle surroundings, for instance in the visible wavelength range, for instance represented by one or more cameras. Moreover, the two or more image capturing devices 3 may respectively comprise at least a first imager (not shown), such as an image sensor, as known in the art. According to an example, the two or more image capturing devices 3 may be comprised in an optional surround camera system (not shown). Out of the one or more image capturing devices 3, a first image capturing device 31 has a first field of view 41 and a second image capturing device 32 has a second field of view 42 with a primary region 421 thereof at least partly overlapping the first field of view 41. The primary region 421 may be of any feasible extent, dimensions and/or degrees, for instance dictated by a position of the first image capturing device 31 relative a position of the second image capturing device 32. In exemplifying FIG. 1, the first image capturing device 31 is depicted to be positioned near and/or comprised in the rear-view mirror with its field of view 41 in an essentially forward direction of the vehicle 2, whereas the second image capturing device 32 is depicted to be positioned near and/or comprised in the right-hand side mirror with its field of view 42 in an essentially right-hand side direction of the vehicle 2. It should be noted, however, that the first and second image capturing devices 31, 32—given the condition that at least a portion referred to as the primary region 421 of the second field of view 42 at least partly overlaps the first field of view 41—may be positioned in any feasible manner, such as alternated and/or at other positions of the vehicle 2 covering other fields of view such as in a rearward direction and/or in a left-hand side direction of the vehicle 2. The region making up the primary region 421 may be identified and/or determined—and/or have been identified and/or determined—in any feasible manner, for instance during calibration such as during factory calibration. "Having a first field of view" may refer to "supporting and/or covering a first field of view", and correspondingly, "having a second field of view" may refer to "supporting and/or covering a second field of view". Moreover, "second field of view with a primary portion thereof at least partly overlapping said first field of view" may refer to "second field of view with a primary portion thereof at least partly and/or to some extent coinciding with said first field of view". The phrase "primary region", on the other hand, may refer to "first region" and/or merely "region", and further to "primary field", "primary section" and/or "primary portion".

As depicted in exemplifying FIG. 2a, the luminance assessment system 1 is—e.g. by means of a primary image obtaining unit 101—adapted and/or configured for obtaining at respective one or more time instants $t_1$, $t_2$, $t_3$, a respective first image 311, 312, 313 with support from the first image capturing device 31 and a respective second image 321, 322, 323 with support from the second image capturing device 32, wherein a first section 310 of the respective first images 311, 312, 313 and a second section 320 of the respective second images 321, 322, 323 respectively cover the primary region 421. Thereby, there is derived at one or more time points $t_1$, $t_2$, $t_3$ from respective first and second image capturing device 31,32, one or more images 311, 312, 313, 321, 322, 323 respectively comprising the overlapping region 421 of the first and second fields of view 41, 42.

Obtaining at respective one or more time instants $t_1$, $t_2$, $t_3$, a respective first image 311, 312, 313 and a respective second image 321, 322, 323 may be accomplished in any feasible—e.g. known—manner, for instance with support from imagers of said image capturing devices 31, 32. The one or more time instants $t_1$, $t_2$, $t_3$ may occur at any feasible points in time, for instance at predeterminable time intervals and/or at predeterminable irregular time points. The respective first images 311, 312, 313 may accordingly be represented by consecutive and/or non-consecutive images and/or image frames captured by the first image capturing device 31, and correspondingly, the respective second images 321, 322, 323 may accordingly be represented by consecutive and/or non-consecutive images and/or image frames captured by the second image capturing device 32. In exemplifying FIG. 2a, a first time instant $t_1$, a second time instant $t_2$ and a third time instant $t_3$ are depicted, it may however be noted that the one or more time instants $t_1$, $t_2$, $t_3$ may be represented by any feasible number of time instants. The first section 310 of the respective first images 311, 312, 313 and the second section 320 of the respective second images 321, 322, 323 respectively covering the primary region 421, may be represented by any feasible area and/or portion of said images 311, 312, 313, 321, 322, 323 comprising said primary region 421, and may accordingly be of any dimensions in accordance therewith. The first section 310 and the second section 320 may be identified and/or determined—and/or have been identified and/or determined—in any feasible manner, for instance during calibration such as during factory calibration. In exemplifying FIG. 2a, the first section 310 and the second section 320 are respectively depicted with rectangular shape, although other shapes and/or dimension also may apply. It may be noted that positioning and dimensions of respective first section 310 in respective first image 311, 312, 313 remain unchanged, and correspondingly, that positioning and dimensions of respective second section 320 in respective second image 321, 322, 323 remain unchanged. The phrase "obtaining at respective one or more time instants" may refer to "deriving and/or capturing at respective one or more time instants", whereas "one or more time instants" may refer to "one or more predeterminable time instants". "A respective first image with support from said first image capturing device", on the other hand, may refer to "a respective first image and/or image frame of a first vehicle surrounding with support from said first image capturing device" and/or "a respective first image utilizing and/or with input from said first image capturing device", and correspondingly, "a respective second image with support from said second image capturing device" may refer to "a respective second image and/or image frame of a second vehicle surrounding with support from said second image capturing device" and/or "a respective second image utilizing and/or with input from said second image capturing device". Moreover, "a first section" may refer to "a first overlapping section" and/or merely "an overlapping section", and correspondingly, "a second section" may refer to "a second overlapping section" and/or merely "an overlapping section". The phrase "respectively covering said primary region", on the other hand, may refer to "respectively essentially covering said primary region" and/or "respectively comprising, reproducing and/or capturing said primary region".

Furthermore, the luminance assessment system 1 is—e.g. by means of a primary luminance measuring unit 103—adapted and/or configured for measuring for respective first image 311, 312, 313 a respective first luminance value 3111, 3121, 3131 of the first section 310, and for respective second image 321, 322, 323 a respective second luminance value 3211, 3221, 3231 of the second section 320. Thereby, for each time point $t_1$, $t_2$, $t_3$, luminance values 3111, 3121, 3131, 3211, 3221, 3231 are derived for the areas 310, 320 of the images 311, 312, 313, 321, 322, 323 covering the primary region 421, i.e. covering the section 421 where the fields of view 41, 42 for the first and second image capturing devices 31, 32 overlap. Accordingly, luminance values 3111, 3121, 3131, 3211, 3221, 3231 applicable for the same area 421—i.e. the primary region 421—at one or more points in time $t_1$, $t_2$, $t_3$, are gathered not only from images 311, 312, 313 obtained by the first image capturing device 31, but also from images 321, 322, 323 obtained by the second image capturing device 32.

Respective luminance value 3111, 3121, 3131, 3211, 3221, 3231 may be measured in any feasible—e.g. known—manner, for instance with support from image processing, and further such as for instance described in Measuring Luminance with a Digital Camera by Peter D. Hiscocks, P. Eng, Feb. 16, 2014. Moreover, said measuring may refer to measurements for at least a portion of respective first section 310 and second section 320, and/or of one or more pixels of said respective first section 310 and second section 320. The phrase "measuring [ . . . ] a respective first luminance value, and [ . . . ] a respective second luminance value" may refer to "detecting, gathering, deriving, obtaining, monitoring and/or determining [ . . . ] a respective first luminance value, and [ . . . ] a respective second luminance value", whereas "luminance value" throughout the disclosure may refer to "luminance value, or range and/or set of luminance values" and according to an example further to "pixel luminance value". Moreover, "respective first luminance value of said first section" may refer to "respective first luminance value of at least a portion—and/or of one or more pixels—of said first section", and correspondingly, "respective second luminance value of said second section" may refer to "respective second luminance value of at least a portion—and/or of one or more pixels—of said second section". The phrase "respective second luminance value of said second section" may further refer to "respective second luminance value of a corresponding second portion and/or pixels of said second section".

Moreover, the luminance assessment system 1 is—e.g. by means of a primary deviation determining unit 105—adapted and/or configured for determining a luminance deviation based on comparing at least one of the respective first luminance values 3111, 3121, 3131 to at least one of the respective second luminance values 3211, 3221, 3231. Thereby, there may be detected potential discrepancy between on one end one or more luminance values 3111, 3121, 3131 applicable for the overlapping primary region 421 obtained by the first image capturing device 31 and on the other end one or more luminance values 3211, 3221, 3231 applicable for said overlapping primary region 421 obtained by the second image capturing device 32.

To determine the luminance deviation, one or more of the respective first luminance values 3111, 3121, 3131 may be compared to one or more of the respective second luminance values 3211, 3221, 3231 in any feasible manner. For instance, a first luminance value 3111—and/or a range of first luminance values 3111—applicable for the first time instant $t_1$ may be compared to a second luminance value 3211—and/or a range of second luminance values 3211—applicable for said first time instant $t_1$. Similarly, additionally or alternatively, for instance a first luminance value 3121—and/or a range of first luminance values 3121—applicable for the second time instant $t_2$ may be compared to a second luminance value 3221—and/or a range of second luminance values 3221—applicable for said second time instant $t_2$, and/or a first luminance value 3131—and/or a range of first luminance values 3131—applicable for the third time instant $t_3$ may be compared to a second luminance value 3231—and/or a range of second luminance values 3231—applicable for said third time instant $t_3$. Optionally, however, determining a luminance deviation may comprise comparing an average—such as a median, mean and/or weighted value—of two or more of the respective first luminance values 3111, 3121, 3131 to an average—such as a median, mean and/or weighted value—of two or more of the respective second luminance values 3211, 3221, 3231. Thereby, potential e.g. glitches may be compensated for, in that a smoothed and/or representative first luminance value may be compared to a representative and/or smoothed second luminance value. The phrase "determining a luminance deviation" may refer to "identifying and/or detecting a luminance deviation", whereas "based on comparing at least one of said respective first luminance values to at least one of said respective second luminance values" may refer to "by determining and/or calculating a difference between at least one of said respective first luminance values and at least one of said respective second luminance values". Moreover, the phrase "comparing at least one of said respective first luminance values to at least one of said respective second luminance values" may refer to "comparing at least one of said respective first luminance values representative for said first luminance value to at least one of said respective second luminance values representative for said second luminance value".

The luminance assessment system 1 is further—e.g. by means of a failure identifying unit 110—adapted and/or configured for determining, when the luminance deviation exceeds a deviation threshold, that the first image capturing device 31 or the second image capturing device 32 fails to function according to the requirement level. Thereby, provided that the determined luminance difference—applicable for the overlapping primary region 421—between luminance values 3111, 3121, 3131 derivable from the first image capturing device 31 and luminance values 3211, 3221, 3231 derivable from the second image capturing device 32, is greater than a predeterminable limit set in view of a predeterminable requirement level, then it is concluded that either the first or the second image capturing device 31, 32 fails to function in accordance therewith. That is, with the introduced concept, there may be detected abnormal image luminance values—which may equate to abnormal voltages—pertinent either the first image capturing device 31 or an imager thereof, or the second image capturing device 32 or an imager thereof. Such abnormal image luminance values and subsequently abnormal voltages in turn insinuate improper functioning, and—should the deviation threshold be exceeded—then non-compliance with the set requirement level, for instance a safety goal such as commonly known ASIL B level, is detected. Accordingly, with the introduced concept according to which image luminance values 3111, 3121, 3131, 3211, 3221, 3231 are monitored, commonly known voltage and clock monitoring by means of IC components—which e.g. may add to complexity and/or overall system cost—may be omitted.

The deviation threshold may be represented by any feasible limit and/or limits—which for instance may vary with varying luminance ranges—and may further be set for instance in view of the implementation at hand and/or desired—e.g. regulatory—requirements and/or goals. Moreover, the deviation threshold may be expressed in any feasible manner, for instance indicating a difference and/or differences expressed in absolute values, additionally or alternatively as a percentage, such as a difference and/or differences greater than e.g. 5 percent, 15 percent, 30 percent or 45 percent. The phrase "determining [ . . . ] that said first image capturing device or said second image capturing device fails" may according to an example refer to "determining [ . . . ] that an imager of said first image capturing device or an imager of said second image capturing device fails". "Fails to function according to said requirement level", on the other hand, may throughout the disclosure refer to "fails to perform according to said requirement level", "is functioning and/or performing inadequately" and/or "renders and/or demonstrates abnormal luminance values and/or abnormal voltages". Moreover, "when said luminance deviation exceeds a deviation threshold" may refer to "when said luminance deviation exceeds a predeterminable deviation threshold" and/or "when said luminance deviation exceeds a deviation threshold set based on, reflecting and/or being pertinent a predeterminable requirement level", and according to an example further to "when said luminance deviation exceeds a deviation threshold set based on, reflecting and/or being pertinent a predeterminable functional requirement level and/or safety level such as an ASIL level, for instance an ASIL B level". "Deviation threshold" may further refer to "first deviation threshold", whereas "when said luminance deviation exceeds a deviation threshold" further may refer to "should, if and/or provided that said luminance deviation exceeds a deviation threshold".

Optionally, as depicted in exemplifying FIG. 1, the vehicle 2 may comprise—out of the one or more image capturing devices 3—a third image capturing device 33 having a third field of view 43 with a secondary region 431 thereof at least partly overlapping the first field of view 41. The secondary region 431 may be of any feasible extent, dimensions and/or degrees, for instance dictated by a position of the first image capturing device 31 relative a position of the third image capturing device 33. In exemplifying FIG. 1, the third image capturing device 33 is depicted to be positioned near and/or comprised in the left-hand side mirror with its field of view 43 in an essentially left-hand side direction of the vehicle 2. It should be noted, however, that the third image capturing device 33—given the condition that at least a portion referred to as the secondary region 431 of the third field of view 43 at least partly overlaps the first field of view 41—may be positioned in any feasible manner, such as at other positions of the vehicle 2 covering another field of view. The region making up the secondary region 423 may be identified and/or determined—and/or have been identified and/or determined—in any feasible manner, for instance during calibration such as during factory calibration. "Having a third field of view" may refer to "supporting and/or covering a third field of view", whereas "third field of view with a secondary portion thereof at least partly overlapping said first field of view" may refer to "third field of view with a secondary portion thereof at least partly and/or to some extent coinciding with said first field of view". The phrase "secondary region", on the other hand, may refer to "second region" and/or merely "region", and further to "secondary field", "secondary section" and/or "secondary portion".

As depicted in exemplifying FIG. 2b, optionally, the luminance assessment system 1 may then—e.g. by means of an optional secondary image obtaining unit 102—be adapted and/or configured for obtaining at respective one or more time instants $t_1$, $t_2$, $t_3$, a respective third image 331, 332, 333 with support from the third image capturing device 33, wherein a third section 330 of the respective third images and a first secondary section 3100 of the respective first images 311, 312, 313 respectively cover the secondary region 431. Thereby, there is additionally derived at the one or more time points $t_1$, $t_2$, $t_3$—from the third image capturing device 33—one or more images 331, 332, 333—which along with the one or more images 311, 312, 313 captured by the first image capturing device 31—respectively comprises the overlapping secondary section 431 of the third and first fields of view 43, 41. Obtaining at the respective one or more time instants $t_1$, $t_2$, $t_3$, a respective third image 331, 332, 333 may be accomplished in any feasible—e.g. known—manner, for instance with support from one or more imagers of the image capturing devices 33. Since the one or more time instants $t_1$, $t_2$, $t_3$ may occur at any feasible points in time, for instance at predeterminable time intervals and/or at predeterminable irregular time points, the respective third images 331, 332, 333 may accordingly be represented by consecutive and/or non-consecutive images and/or image frames captured by the third image capturing device 33. The first secondary section 3100 of the respective first images 311, 312, 313 and the third section 330 of the respective third images 331, 332, 333, respectively covering the secondary region 431, may be represented by any feasible area and/or portion of said images 311, 312, 313, 331, 332, 333 comprising said secondary region 431, and may accordingly be of any dimensions in accordance therewith. The first secondary section 3100 and the third section 330 may be identified and/or determined—and/or have been identified and/or determined—in any feasible manner, for instance during calibration such as during factory calibration. In exemplifying FIG. 2b, the first secondary section 3100 and the third section 330 are respectively depicted with rectangular shape, although other shapes and/or dimension also may apply. It may be noted that positioning and dimensions of respective first secondary section 3100 in respective first image 311, 312, 313 remain unchanged, and correspondingly, that positioning and dimensions of respective third section 330 in respective third image 331, 332, 333 remain unchanged. The phrase "a respective third image with support from said third image capturing device" may refer to "a respective third image and/or image frame of a third vehicle surrounding with support from said third image capturing device" and/or "a respective third image utilizing and/or with input from said third image capturing device". Moreover, "a first secondary section" may refer to "a first overlapping secondary section" and/or merely "an overlapping section", and correspondingly, "a third section" may refer to "a third overlapping section" and/or merely "an overlapping section". The phrase "respectively covering said secondary region", on the other hand, may refer to "respectively essentially covering said secondary region" and/or "respectively comprising, reproducing and/or capturing said secondary region".

Further optionally, the luminance assessment system 1 may then—e.g. by means of an optional secondary luminance measuring unit 104—be adapted and/or configured for measuring for respective third image 331, 332, 333 a respective third luminance value 3311, 3321, 3331 of the third section 330, and for respective first image 311, 312, 313 a respective first secondary luminance value 31110, 31210, 31310 of the first secondary section 3100. Thereby, for each time point $t_1$, $t_2$, $t_3$, luminance values 31110, 31210, 31310, 3311, 3321, 3331 are derived for the areas 3100, 330 of the images 311, 312, 313, 331, 332, 333 covering the secondary region 431, i.e. covering the section 431 where the fields of view 41, 43 for the first and third image capturing devices 31, 33 overlap. Accordingly, luminance values 31110, 31210, 31310, 3311, 3321, 3331 applicable for the same area 431—i.e. the secondary region 431—at one or more points in time $t_1$, $t_2$, $t_3$, are gathered not only from images 311, 312, 313 obtained by the first image capturing device 31, but also from images 331, 332, 333 obtained by the third image capturing device 33. Respective luminance value 31110, 31210, 31310, 3311, 3321, 3331 may be measured in any feasible—e.g. known—manner, such as—as indicated above—for instance with support from image processing, and further such as for instance described in Measuring Luminance with a Digital Camera by Peter D. Hiscocks, P. Eng, Feb. 16, 2014. Moreover, said measuring may refer to measurements for at least a portion of respective first secondary section 3100 and third section 330, and/or of one or more pixels of said respective first secondary section 3100 and third section 330. The phrase "measuring [ . . . ] a respective third luminance value, and [ . . . ] a respective first secondary luminance value" may refer to "detecting, gathering, deriving, obtaining, monitoring and/or determining [ . . . ] a respective third luminance value, and [ . . . ] a respective first secondary luminance value". Moreover, "respective third luminance value of said third section" may refer to "respective third luminance value of at least a portion—and/or of one or more pixels—of said third section", and correspondingly, the phrase "respective first secondary luminance value of said first secondary section" may refer to "respective first secondary luminance value of at least a portion—and/or of one or more pixels—of said first secondary section". The phrase respective first secondary luminance value of said first secondary section" may further refer to "respective first secondary luminance value of a corresponding secondary portion and/or pixels of said first secondary section"

Further optionally, the luminance assessment system 1 may then—e.g. by means of an optional secondary deviation determining unit 106—be adapted and/or configured for determining a secondary luminance deviation based on comparing at least one of the respective third luminance values 3311, 3321, 3331 to at least one of the respective first secondary luminance values 31110, 31210, 31310. Thereby, there may be detected potential discrepancy between on one end one or more luminance values 31110, 31210, 31310 applicable for the overlapping secondary region 431 obtained by the first image capturing device 3 and on the other end one or more luminance values 3311, 3321, 3331 applicable for said overlapping secondary region 431 obtained by the third image capturing device 33. To determine the secondary luminance deviation, one or more of the respective first secondary luminance values 31110, 31210, 31310 may be compared to one or more of the respective third luminance values 3311, 3321, 3331 in any feasible manner. For instance, a first secondary luminance value 31110—and/or a range of first secondary luminance values 31110—applicable for the first time instant $t_1$ may be compared to a third luminance value 3311—and/or a range of third luminance values 3311—applicable for said first time instant $t_1$. Similarly, additionally or alternatively, for instance a first secondary luminance value 31210—and/or a range of first secondary luminance values 31210—applicable for the second time instant $t_2$ may be compared to a third luminance value 3321—and/or a range of third luminance values 3321—applicable for said second time instant $t_2$, and/or a first secondary luminance value 31310—and/or a range of first secondary luminance values 31310—applicable for the third time instant $t_3$ may be compared to a third luminance value 3331—and/or a range of third luminance values 3331—applicable for said third time instant t3. Optionally, however, determining a secondary luminance deviation may comprise comparing an average—such as a median, mean and/or weighted value—of two or more of the respective third luminance values 3311, 3321, 3331 to an average—such as a median, mean and/or weighted value—of two or more of the respective first secondary luminance values 31110, 31210, 31310. Thereby, potential e.g. glitches may be compensated for, in that a smoothed and/or representative third luminance value 3311, 3321, 3331 may be compared to a representative and/or smoothed first secondary luminance value 31110, 31210, 31310. The phrase "determining a secondary luminance deviation" may refer to "identifying and/or detecting a secondary luminance deviation", whereas "based on comparing at least one of said respective third luminance values to at least one of said respective first secondary luminance values" may refer to "by determining and/or calculating a difference between at least one of said respective third luminance values and at least one of said respective first secondary luminance values". Moreover, the phrase "comparing at least one of said respective third luminance values to at least one of said respective first secondary luminance values" may refer to "comparing at least one of said respective third luminance values representative for said third luminance value to at least one of said respective first secondary luminance values representative for said first secondary luminance value".

Further optionally, the luminance assessment system 1 may then—e.g. by means of an optional device identifying unit 111—be adapted and/or configured for identifying, when the secondary luminance deviation exceeds a secondary deviation threshold, that it is the first image capturing device 31 that fails to function according to the requirement level, and/or when the secondary luminance deviation does not exceed the secondary deviation threshold, that it is the second image capturing device 32 that fails to function according to the requirement level. Thereby, provided that the secondary determined luminance difference—applicable for the overlapping secondary region 431—between luminance values 31110, 31210, 31310 derivable from the first image capturing device 31 and luminance values 3311, 3321, 3331 derivable from the third image capturing device 33, is greater than a predeterminable second limit—which potentially may be equal to the deviation threshold discussed above and/or set in view of the predeterminable requirement level—then it is concluded that the first image capturing device 31 is the device out of the first and second image capturing devices 31, 32 that fails to function in accordance with the requirement level. That is, since the first image capturing device 31 is involved in luminance values comparison in view of both the deviation threshold—i.e. in consideration of the overlapping primary region 421 and subsequently the second image capturing device 32—and the secondary deviation threshold—i.e. in consideration of the overlapping secondary region 431 and subsequently the third image capturing device 33—and since it then is established that both these thresholds are exceeded, it may be concluded that it is the first image capturing device 31 or an imager thereof that demonstrates abnormal luminance values 3111, 3121, 3131, 31110, 31210, 31310. On the other hand, provided that the secondary determined luminance difference not is greater than said predeterminable second limit, then it is concluded that the second image capturing device 32 is the device out of the first and second image capturing devices 31, 32 that fails to function in accordance with the requirement level. That is, since the first image capturing device 31 as indicated above is involved in luminance values comparison in view of both the deviation threshold and the secondary deviation threshold, and since it is established that the secondary deviation threshold then not is exceeded thus implying that the first image capturing device 31 or an imager thereof does not demonstrate abnormal luminance values 31110, 31210, 31310 as compared to luminance values 3311, 3321, 3331 of the third image capturing device 33, it may be concluded that it rather than the first image capturing device 31 is the second image capturing device 32 or an imager thereof that demonstrates abnormal luminance values 3211, 3221, 3231.

The secondary deviation threshold may potentially, although not necessarily, be set to be equal to—or at least to some extent be equal to—the deviation threshold discussed above in view of the second primary region 241. Accordingly, the secondary deviation threshold may be represented by any feasible limit and/or limits—which for instance may vary with varying luminance ranges—and may further be set for instance in view of the implementation at hand and/or desired—e.g. regulatory—requirements and/or goals. Moreover, the secondary deviation threshold may be expressed in any feasible manner, for instance indicating a difference and/or differences expressed in absolute values, additionally or alternatively as a percentage, such as a difference and/or differences greater than e.g. 5 percent, 15 percent, 30 percent or 45 percent. The phrase "identifying [ . . . ] that is it" may refer to "determining and/or concluding [ . . . ] that it is". The phrase "that it is said first image capturing device that fails", on the other hand, may refer to "that it is an imager of said first image capturing device that fails", and correspondingly, the phrase "that it is said second image capturing device that fails" may refer to "that it is an imager of said second image capturing device that fails". Moreover, the phrase "when said secondary luminance deviation exceeds a secondary deviation threshold" may refer to "when said secondary luminance deviation exceeds a predeterminable secondary deviation threshold" and/or "when said secondary luminance deviation exceeds a secondary deviation threshold set based on, reflecting and/or being pertinent a predeterminable requirement level", and according to an example further to "when said secondary luminance deviation exceeds a secondary deviation threshold set based on, reflecting and/or being pertinent a predeterminable functional requirement level and/or safety level such as an ASIL level, for instance an ASIL B level". Furthermore, "when said secondary luminance deviation exceeds a secondary deviation threshold" may further refer to "should, if and/or provided that said secondary luminance deviation exceeds a secondary deviation threshold". "Secondary deviation threshold" may further refer to "second deviation threshold", whereas "when said secondary luminance deviation does not exceed said secondary deviation threshold" may further refer to "should, if and/or provided that said secondary luminance deviation does not exceed said secondary deviation threshold". The phrase "and/or when said secondary luminance deviation does not exceed said secondary deviation threshold, that it is said second image capturing device that fails to function according to said requirement level", on the other hand, may refer to "otherwise, that it is said second image capturing device that fails to function according to said requirement level".

It may be noted that the vehicle 2 may comprise any further arbitrary number of image capturing devices 3, such as—as depicted in exemplifying FIG. 1—a fourth image capturing device 34 having a fourth field of view 44. In exemplifying FIG. 1, the fourth field of view 44—in combination with the first, second and third fields of view, 41, 42, 43—enable for 360 degrees vehicle surroundings to be covered. It may be noted, however, that any other combination and/or number of image capturing devices 3 may be used to accomplish the same or similar effect. It may further be noted that the optional fourth image capturing device 34 and/or any further image capturing device 3, may—with respective overlapping field of view regions—contribute to and/or support the inventive concept presented herein.

Optionally, the luminance assessment system 1 may—e.g. by means of an optional affecting element determining unit 109—be adapted and/or configured for determining whether there is presence of an image luminance affecting element (not shown), such as e.g. a tunnel and/or overpass, within image capturing device range of the vehicle 2. Determining that the first image capturing device 1 or the second image capturing device 32 fails to function according to the requirement level, as described above, then comprises determining, when the luminance deviation exceeds a luminance deviation threshold and when there is determined no presence of an image luminance affecting element, that the first image capturing device 31 or the second image capturing device 32 fails to function according to the requirement level. Thereby, provided that the determined luminance difference—applicable for the overlapping primary region 421—between luminance values 3111, 3121, 3131 derivable from the first image capturing device 31 and luminance values 3211, 3221, 3231 derivable from the second image capturing device 32, is greater than the predeterminable limit set in view of the predeterminable requirement level, and in addition thereto provided that there is established absence in vicinity the vehicle 2 of elements which potentially may affect luminance in captured images 311, 312, 313, 321, 322, 323, then it is concluded that either the first or the second image capturing device 31, 32 fails to function in accordance therewith. That is, should it be determined that an image luminance affecting element is present within range of the vehicle 2, then said image luminance affecting element, e.g. a tunnel and/or overpass, may potentially—e.g. by casting shadows and/or darkness—affect the measured luminance values 3111, 3121, 3131, 3211, 3221, 3231 in the captured images 311, 312, 313, 3212, 322, 323—a situation that for instance may occur if the image capturing devices are provided at different positions of the vehicle 2, such as at differing longitudinal positions of the vehicle 2. Consequently, in such a case, the measured respective first luminance values 3111, 3121, 3131 may potentially differ from the measured respective second luminance values 3211, 3221, 3231 to such extent that the deviation threshold is exceeded due to impact from said image luminance affecting element rather than due to the first or second image capturing device 31, 32 failing to function according to the requirement level. Thus, according to this embodiment, should it be determined that there is presence of an image luminance affecting element within image capturing device range of the vehicle 2, then the luminance assessment system 1 refrains from determining that the first image capturing device 31 or the second image capturing device 32 fails to function according to the requirement level, even though the luminance deviation may exceed the requirement level.

The image luminance affecting element may refer to any feasible element and/or object potentially having impact on luminance of images captured by the image capturing devices 3, such as a tunnel, overpass, bridge etc. Determining whether there is presence of an image luminance affecting element may be accomplished in any feasible—e.g. known—manner. For instance, absence or presence thereof may for instance be determined by means of commonly known object detection and/or image processing. Optionally, however, the luminance assessment system 1 may—e.g. by means of an optional vehicle position determining unit 107—be adapted and/or configured for determining, with support from a positioning system 24, a position of the vehicle 2, and further—e.g. by means of an optional vehicle localization unit 108—be adapted and/or configured for localizing, based on the vehicle position, the vehicle 2 in view of a digital map 23. Determining whether there is presence of an image luminance affecting element, as described above, then comprises determining whether there in the digital map 23 is presence of an image luminance affecting element within image capturing device range of the vehicle 2. Thereby, by localizing the vehicle 2 in view of a digital map 23, and further analysing map data thereof, it may be derived whether there is—within range of the in the digital map 23 mapped vehicle 2 location—an element in said digital map 23 which is deemed to potentially affect image luminance. Determining the position of the vehicle 2, and further localizing the vehicle 2 in view of a digital map 23, may be accomplished in any feasible—e.g. known—manner, with support from a positioning system and further e.g. with support from an optional perception system 22 or similar system and/or functionality described above. The phrase "determining whether there is presence of an image luminance affecting element" may refer to "identifying, estimating and/or deriving whether there is presence of an image luminance affecting element" and/or "determining whether an image luminance affecting element is present", whereas "image luminance affecting element" may refer to "image luminance affecting object", "image luminance affecting stationary and/or dynamic element" and/or "element potentially affecting and/or impacting image luminance". Moreover, the phrase "within image capturing device range of said vehicle" may refer to "within a predeterminable distance from said vehicle, such as within 100, 50 or 5 meters from said vehicle", "within image capturing device range of said first image capturing device and/or said second image capturing device", and according to an example further to "within said primary region". The phrase "when there is determined no presence of an image luminance affecting element" may refer to "should it be, provided that there is and/or if there is determined no presence of an image luminance affecting element".

As further shown in FIG. 3, the luminance assessment system 1 comprises a primary image obtaining unit 101, a primary luminance measuring unit 103, a primary deviation determining unit 105, a failure identifying unit 110, an optional secondary image obtaining unit 102, an optional secondary luminance measuring unit 104, an optional secondary deviation determining unit 106, an optional device identifying unit 111, an optional vehicle position determining unit 107, an optional vehicle localization unit 108, an optional affecting element determining unit 109, all of which already have been described in greater detail above. Furthermore, the embodiments herein for monitoring of on-board vehicle image capturing device functionality compliance with a predeterminable requirement level, may be implemented through one or more processors, such as a processor 112, here denoted CPU, together with computer program code for performing the functions and actions of the embodiments herein. Said program code may also be provided as a computer program product, for instance in the form of a data carrier carrying computer program code for performing the embodiments herein when being loaded into the luminance assessment system 1. One such carrier may be in the form of a CD ROM disc and/or a hard drive, it is however feasible with other data carriers. The computer program code may furthermore be provided as pure program code on a server and downloaded to the luminance assessment system 1. The luminance assessment system 1 may further comprise a memory 113 comprising one or more memory units. The memory 113 may be arranged to be used to store e.g. information, and further to store data, configurations, schedulings, and applications, to perform the methods herein when being executed in the luminance assessment system 1. For instance, the computer program code may be implemented in the firmware, stored in FLASH memory 113, of an embedded processor 112, and/or downloaded wirelessly e.g. from an off-board server. Furthermore, said units 101-111, the optional processor 112 and/or the optional memory 113, may at least partly be comprised in one or more nodes 114 e.g. ECUs of the vehicle 2, e.g. in and/or in association with the optional ADAS or ADS system 21 and/or one or more image capturing devices 3. Those skilled in the art will also appreciate that said units 101-111 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 113, that when executed by the one or more processors such as the processor 112 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Figure 4:
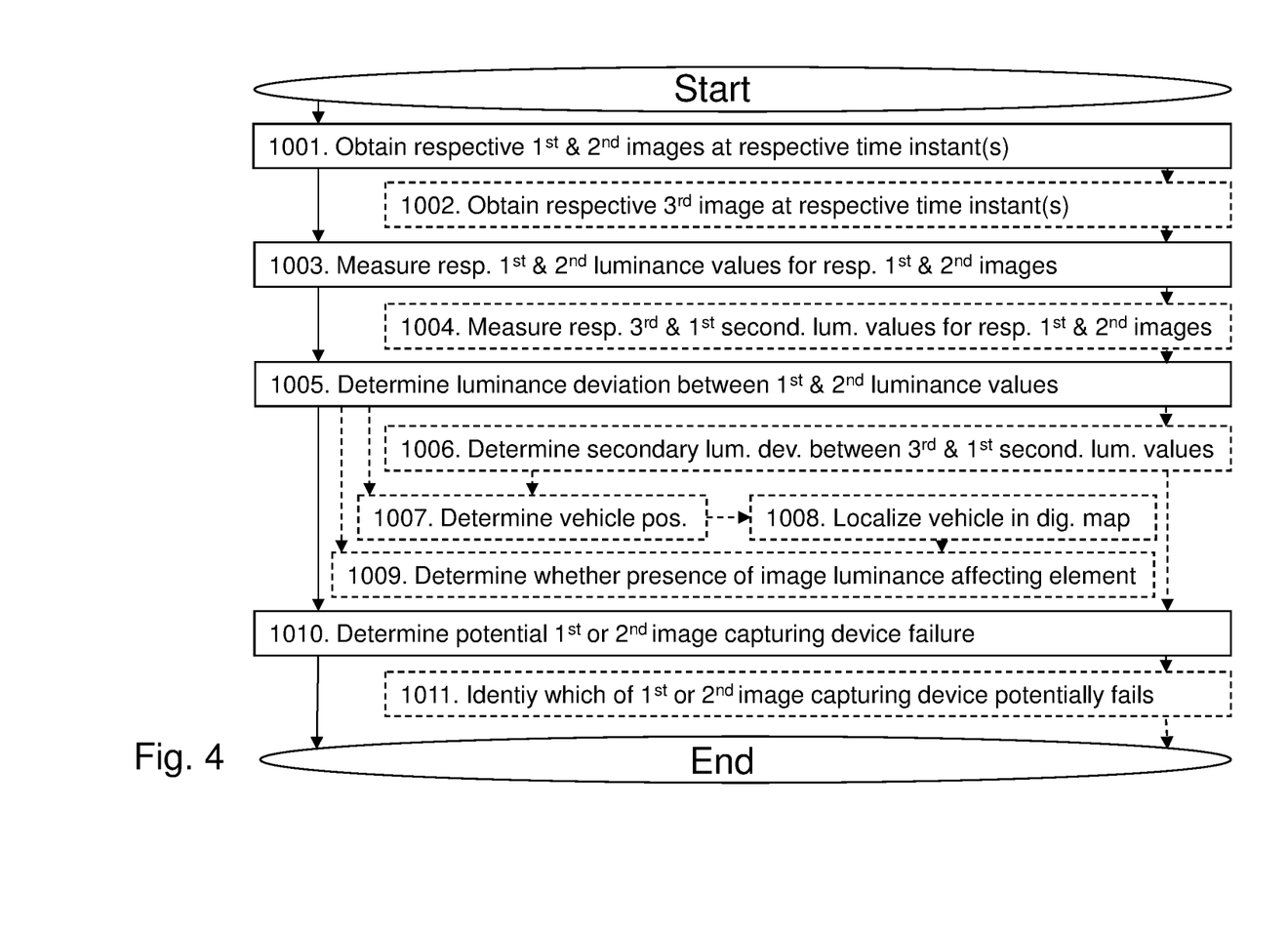
FIG. 4 is a flowchart depicting an exemplifying method performed by a luminance assessment system according to embodiments of the disclosure.

FIG. 4 is a flowchart depicting an exemplifying method performed by a luminance assessment system 1 according to embodiments of the disclosure. Said method is for monitoring of on-board vehicle image capturing device functionality compliance with a predeterminable requirement level. The exemplifying method, which may be continuously repeated, comprises one or more of the following actions discussed with support from FIGS. 1, 2a, 2b and 3. Moreover, the actions may be taken in any suitable order and/or one or more actions may be performed simultaneously and/or in alternate order where applicable. For instance, Action 1001 and optional Action 1002 may be performed simultaneously and/or in alternate order. Similarly, Action 1003 and optional Action 1004, and/or Action 1005 and optional Action 1006, may be performed simultaneously and/or in alternate order, whereas optional Actions 1007-1009 and one or more of Actions 1001-1006 in a similar manner may be performed simultaneously and/or in alternate order.

Action 1001

In Action 1001, the luminance assessment system 1 obtains—e.g. with support from the primary image obtaining unit 101—at respective one or more time instants $t_1$, $t_2$, $t_3$, a respective first image 311, 312, 313 with support from the first image capturing device 31 and a respective second image 321, 322, 323 with support from the second image capturing device 32, wherein a first section 310 of the respective first images 311, 312, 313 and a second section 320 of the respective second images 32, 322, 323 respectively cover the primary region 421.

Action 1002

Optionally, a third image capturing device 33 has a third field of view 43 with a secondary region 431 thereof at least partly overlapping the first field of view 41. Accordingly, in optional Action 1002, the luminance assessment system 1 may obtain—e.g. with support from the optional secondary image obtaining unit 102—at respective one or more time instants $t_1$, $t_2$, $t_3$, a respective third image 331, 332, 333 with support from the third image capturing device 33, wherein a third section 330 of the respective third images 331, 332, 333 and a first secondary section 3100 of the respective first images 311, 312, 313 respectively cover the secondary region 431.

Action 1003

In Action 1003, the luminance assessment system 1 measures—e.g. with support from the primary luminance measuring unit 103—for respective first image 311, 312, 313, a respective first luminance value 3111, 3121, 3131 of the first section 310, and for respective second image 321, 322, 323 a respective second luminance value 3211, 3221, 3231 of the second section 320.

Action 1004

In optional Action 1004, which may follow upon optional Action 1002, the luminance assessment system 1 may measure—e.g. with support from the optional secondary luminance measuring unit 104—for respective third image 331, 332, 333 a respective third luminance value 3311, 3321, 3331 of the third section 330, and for respective first image 311, 312, 313 a respective first secondary luminance value 31110, 31210, 31310 of the first secondary section 3100.

Action 1005

In Action 1005, the luminance assessment system 1 determines—e.g. with support from the primary deviation determining unit 105—a luminance deviation based on comparing at least one of the respective first luminance values 3111, 3121, 3131 to at least one of the respective second luminance values 3211, 3221, 3231.

Optionally, Action 1005 of determining a luminance deviation may comprise—and/or the primary deviation determining unit 105 may be adapted and/or configured for—comparing an average of two or more of the respective first luminance values 3111, 3121, 3131 to an average of two or more of the respective second luminance values 3211, 3221, 3231.

Action 1006

In optional Action 1006, which may follow upon optional Action 1004, the luminance assessment system 1 may determine—e.g. with support from the optional secondary deviation determining unit 106—a secondary luminance deviation based on comparing at least one of the respective third luminance values 3311, 3321, 3331 to at least one of the respective first secondary luminance values 31110, 31210, 31310.

Optionally, Action 1006 of determining a secondary luminance deviation may comprise—and/or the optional secondary deviation determining unit 106 may be adapted and/or configured for—comparing an average of two or more of the respective third luminance values 3311, 3321, 3331 to an average of two or more of the respective first secondary luminance values 31110, 31210, 31310.

Action 1007

In optional Action 1007, the luminance assessment system 1 may determine—e.g. with support from the optional vehicle position determining unit 107—with support from a positioning system 24, a position of the vehicle 2.

Action 1008

In optional Action 1008, which may follow upon optional Action 1007, the luminance assessment system 1 may localize—e.g. with support from the optional vehicle localization unit 108—based on the vehicle position, the vehicle 2 in view of a digital map 23.

Action 1009

In optional Action 1009, the luminance assessment system 1 may determine—e.g. with support from the optional affecting element determining unit 109—whether there is presence of an image luminance affecting element, such as e.g. a tunnel and/or overpass, within image capturing device range of the vehicle 2.

Optionally, should Action 1009 follow upon Action 1008 of localizing the vehicle 2 in view of a digital map 23, then Action 1009 may comprise—and/or the optional affecting element determining unit 109 may be adapted and/or configured for—determining whether there in the digital map 23 is presence of an image luminance affecting element within image capturing device range of the vehicle 2.

Action 1010

In Action 1010, the luminance assessment system 1 determines—e.g. with support from the failure identifying unit 110—when the luminance deviation exceeds a deviation threshold, that the first image capturing device 31 or the second image capturing device 32 fails to function according to the requirement level.

Optionally, should Action 1010 follow upon Action 1009 of determining whether there is presence of an image luminance affecting element, then said determining of Action 1010 may comprise—and/or the failure identifying unit 110 may be adapted and/or configured for—determining, when the luminance deviation exceeds a luminance deviation threshold and when there is determined no presence of an image luminance affecting element, that the first image capturing device 31 or the second image capturing device 32 fails to function according to the requirement level.

Action 1011

In optional Action 1011, which may follow upon optional Action 1006, the luminance assessment system 1 may determine—e.g. with support from the optional device identifying unit 111—when the secondary luminance deviation exceeds a secondary deviation threshold, that it is the first image capturing device 31 that fails to function according to the requirement level, and/or when the secondary luminance deviation does not exceed the secondary deviation threshold, that it is the second image capturing device 32 that fails to function according to the requirement level.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a luminance assessment system of a vehicle for monitoring of on-board vehicle image capturing device functionality compliance with a predeterminable requirement level, the vehicle comprising two or more image capturing devices configured to capture surroundings of the vehicle, a first image capturing device having a first field of view and a second image capturing device having a second field of view with a primary region thereof at least partly overlapping the first field of view, the method comprising:

obtaining at respective one or more time instants ($t_1$, $t_2$, $t_3$), a respective first image with support from the first image capturing device and a respective second image with support from the second image capturing device, a first section of the respective first image and a second section of the respective second image respectively covering the primary region;

measuring for respective first image a respective first luminance value based on measurements of a plurality of pixels of the first section, and for respective second image a respective second luminance value based on measurements of a plurality of pixels of the second section;

determining a luminance deviation exceeds a deviation threshold, the luminance deviation being based on a comparison of at least one of the respective first luminance values to at least one of the respective second luminance values;

determining, with support from a positioning system, a position of the vehicle;

localizing, based on the position of the vehicle, the vehicle in a digital map;

determining, based on the position of the vehicle in the digital map, that there is no presence of an image luminance affecting element within an image capturing device range of the vehicle, the image luminance affecting element being a light-obstructing element; and determining, based on the luminance deviation exceeding the deviation threshold and there being no presence of the image luminance affecting element within the image capturing device range of the vehicle, that one of the first image capturing device and the second image capturing device fails to function according to the requirement level.

2. The method according to claim 1, wherein determining a luminance deviation comprises comparing an average of two or more of the respective first luminance values to an average of two or more of the respective second luminance values.

3. The method according to claim 2, wherein a third image capturing device has a third field of view with a secondary region thereof at least partly overlapping the first field of view, the method further comprising:

obtaining at respective one or more time instants ($t_1$, $t_2$, $t_3$), a respective third image with support from the third image capturing device, a third section of the respective third image and a first secondary section of the respective first image respectively covering the secondary region;

measuring for respective third image a respective third luminance value based on measurements of a plurality of pixels of the third section, and for respective first image a respective first secondary luminance value of the first secondary section;

determining a secondary luminance deviation based on comparing at least one of the respective third luminance values to at least one of the respective first secondary luminance values; and identifying at least one of:

when the secondary luminance deviation exceeds a secondary deviation threshold, that it is the first image capturing device that fails to function according to the requirement level; and when the secondary luminance deviation does not exceed the secondary deviation threshold, that it is the second image capturing device that fails to function according to the requirement level.

4. The method according to claim 1, wherein a third image capturing device has a third field of view with a secondary region thereof at least partly overlapping the first field of view, the method further comprising:

obtaining at respective one or more time instants ($t_1$, $t_2$, $t_3$), a respective third image with support from the third image capturing device, a third section of the respective third image and a first secondary section of the respective first image respectively covering the secondary region;

measuring for respective third image a respective third luminance value based on measurements of a plurality of pixels of the third section, and for respective first image a respective first secondary luminance value based on measurements of a plurality of pixels of the first secondary section;

determining a secondary luminance deviation based on comparing at least one of the respective third luminance values to at least one of the respective first secondary luminance values; and identifying at least one of:
when the secondary luminance deviation exceeds a secondary deviation threshold, that it is the first image capturing device that fails to function according to the requirement level; and
when the secondary luminance deviation does not exceed the secondary deviation threshold, that it is the second image capturing device that fails to function according to the requirement level.

5. The method according to claim 4, wherein the determining a secondary luminance deviation comprises comparing an average of two or more of the respective third luminance values to an average of two or more of the respective first secondary luminance values.

6. The method according to claim 3, wherein the determining a secondary luminance deviation comprises comparing an average of two or more of the respective third luminance values to an average of two or more of the respective first secondary luminance values.

7. A luminance assessment system for a vehicle for monitoring of on-board vehicle image capturing device functionality compliance with a predeterminable requirement level, the vehicle comprising two or more image capturing devices configured to capture surroundings of the vehicle, each of the two or more image capturing devices including a camera, a first image capturing device having a first field of view and a second image capturing device having a second field of view with a primary region thereof at least partly overlapping the first field of view, the luminance assessment system comprising:

a processor configured to:
obtain at respective one or more time instants ($t_1$, $t_2$, $t_3$), a respective first image with support from the first image capturing device and a respective second image with support from the second image capturing device, a first section of the respective first image and a second section of the respective second image respectively covering the primary region;

measure for respective first image a respective first luminance value based on measurements of a plurality of pixels of the first section, and for respective second image a respective second luminance value based on measurements of a plurality of pixels of the second section;

determine a luminance deviation exceeds a deviation threshold, the luminance deviation being based on a comparison of at least one of the respective first luminance values to at least one of the respective second luminance values;

determine, with support from a positioning system, a position of the vehicle;

localize, based on the vehicle position, the vehicle in a digital map;

determine, based on the vehicle position in the digital map, that there is no presence of an image luminance affecting element within an image capturing device range of the vehicle, the image luminance affecting element being a light-obstructing element; and determine, based on the luminance deviation exceeding the deviation threshold and the processor determining there being no presence of an image luminance affecting element within the image capturing device range of the vehicle, that one of the first image capturing device and the second image capturing device fails to function according to the requirement level.

8. The luminance assessment system according to claim 7, wherein the processor is configured to compare an average of two or more of the respective first luminance values to an average of two or more of the respective second luminance values.

9. The luminance assessment system according to claim 8, wherein a third image capturing device has a third field of view with a secondary region thereof at least partly overlapping the first field of view, the processor being further configured to:

obtain at respective one or more time instants ($t_1$, $t_2$, $t_3$), a respective third image with support from the third image capturing device, a third section of the respective third image and a first secondary section of the respective first image respectively covering the secondary region;

measure for respective third image a respective third luminance value based on measurements of a plurality of pixels of the third section, and for respective first image a respective first secondary luminance value based on measurements of a plurality of pixels of the first secondary section;

determine a secondary luminance deviation based on comparing at least one of the respective third luminance values to at least one of the respective first secondary luminance values; and identify at least one of:
when the secondary luminance deviation exceeds a secondary deviation threshold, that it is the first image capturing device that fails to function according to the requirement level; and
when the secondary luminance deviation does not exceed the secondary deviation threshold, that it is the second image capturing device that fails to function according to the requirement level.

10. The luminance assessment system according to claim 7, wherein a third image capturing device has a third field of view with a secondary region thereof at least partly overlapping the first field of view, the processor being further configured to:

obtain at respective one or more time instants ($t_1$, $t_2$, $t_3$), a respective third image with support from the third image capturing device, a third section of the respective third image and a first secondary section of the respective first image respectively covering the secondary region;

measure for respective third image a respective third luminance value based on measurements of a plurality of pixels of the third section, and for respective first image a respective first secondary luminance value based on measurements of a plurality of pixels of the first secondary section;

determine a secondary luminance deviation based on comparing at least one of the respective third luminance values to at least one of the respective first secondary luminance values; and identify at least one of:
when the secondary luminance deviation exceeds a secondary deviation threshold, that it is the first image capturing device that fails to function according to the requirement level; and
when the secondary luminance deviation does not exceed the secondary deviation threshold, that it is the second image capturing device that fails to function according to the requirement level.

11. The luminance assessment system according to claim 9, wherein the processor is further configured to compare an average of two or more of the respective third luminance values to an average of two or more of the respective first secondary luminance values.

12. The luminance assessment system according to claim 10, wherein the processor is further configured to compare an average of two or more of the respective third luminance values to an average of two or more of the respective first secondary luminance values.

13. The luminance assessment system according to claim 8, wherein the processor is further configured to:
determine, when the luminance deviation exceeds a luminance deviation threshold and when there is determined no presence of an image luminance affecting element, that one of the first image capturing device and the second image capturing device fails to function according to the requirement level.

14. The luminance assessment system according to claim 7, wherein the processor is further configured to:
determine, when the luminance deviation exceeds a luminance deviation threshold and when there is determined no presence of an image luminance affecting element, that one of the first image capturing device and the second image capturing device fails to function according to the requirement level.

15. A vehicle comprising:
a luminance assessment system, the luminance assessment system for monitoring of on-board vehicle image capturing device functionality compliance with a predeterminable requirement level, the vehicle comprising two or more image capturing devices configured to capture surroundings of the vehicle, each of the two or more image capturing devices including a camera, a first image capturing device having a first field of view and a second image capturing device having a second field of view with a primary region thereof at least partly overlapping the first field of view, the luminance assessment system comprising:
a processor configured to:
obtain at respective one or more time instants ($t_1, t_2, t_3$), a respective first image with support from the first image capturing device and a respective second image with support from the second image capturing device, a first section of the respective first image and a second section of the respective second image respectively covering the primary region;

measure for respective first image a respective first luminance value based on measurements of a plurality of pixels of the first section, and for respective second image a respective second luminance value based on measurements of a plurality of pixels of the second section;

determine a luminance deviation exceeds a deviation threshold, the luminance deviation being based on a comparison of at least one of the respective first luminance values to at least one of the respective second luminance values;

determine, with support from a positioning system, a position of the vehicle; and localize based on the position of the vehicle, the vehicle in view of a digital map;

determine, based on the position of the vehicle, that there is no presence of an image luminance affecting element within an image capturing device range of the vehicle, the image luminance affecting element being a light-obstructing element; and determine, based on the luminance deviation exceeding the deviation threshold and there being no presence of the image luminance affecting element within an image capturing device range of the vehicle, that one of the first image capturing device and the second image capturing device fails to function according to the requirement level.

16. A computer readable storage medium having stored thereon an executable computer program that, when executed, performs a method for a vehicle for monitoring of on-board vehicle image capturing device functionality compliance with a predeterminable requirement level, the vehicle comprising two or more image capturing devices configured to capture surroundings of the vehicle, a first image capturing device having a first field of view and a second image capturing device having a second field of view with a primary region thereof at least partly overlapping the first field of view, the method comprising:
obtaining at respective one or more time instants ($t_1, t_2, t_3$), a respective first image with support from the first image capturing device and a respective second image with support from the second image capturing device, a first section of the respective first image and a second section of the respective second image respectively covering the primary region;

measuring for respective first image a respective first luminance value based on measurements of a plurality of pixels of the first section, and for respective second image a respective second luminance value based on measurements of a plurality of pixels of the second section;

determining a luminance deviation exceeds a deviation threshold, the luminance deviation being based on a comparison of at least one of the respective first luminance values to at least one of the respective second luminance values;

determining, with support from a positioning system, a position of the vehicle;

localizing based on the position of the vehicle, the vehicle in view of a digital map;

determining, based on the position of the vehicle in the digital map, that there is no presence of an image luminance affecting element within an image capturing device range of the vehicle, the image luminance affecting element being a light-obstructing element; and determining, based on the luminance deviation exceeding the deviation threshold and there being no presence of the image luminance affecting element within the image capturing device range of the vehicle, that one of the first image capturing device and the second image capturing device fails to function according to the requirement level.

* * * * *